United States Patent

Spangler

[15] 3,675,213

[45] July 4, 1972

[54] STORED DATA RECALL MEANS FOR AN ELECTRONIC CALCULATOR

[72] Inventor: Richard M. Spangler, Loveland, Colo.

[73] Assignee: Hewlett-Packard Company, Palo Alto, Calif.

[22] Filed: Oct. 14, 1970

[21] Appl. No.: 80,534

[52] U.S. Cl. .......... 340/172.5

[51] Int. Cl. .......... G06f 3/02

[58] Field of Search .......... 340/172.5, 365

[56] References Cited

UNITED STATES PATENTS

| | | | |
|---|---|---|---|
| 3,487,369 | 12/1969 | King et al. | 340/172.5 |
| 3,380,031 | 4/1968 | Clayton et al. | 340/172.5 |
| 3,158,317 | 11/1964 | Alexander | 340/172.5 X |
| 3,187,321 | 6/1965 | Kameny | 340/172.5 |
| 3,381,276 | 4/1968 | James | 340/172.5 |
| 3,495,222 | 2/1970 | Perotto et al. | 340/172.5 |
| 3,533,076 | 10/1970 | Perkins et al. | 340/172.5 |

*Primary Examiner*—Gareth D. Shaw
*Assistant Examiner*—Melvin B. Chapnick
*Attorney*—Roland I. Griffin

[57] ABSTRACT

A calculator instruction key is provided which preconditions the calculator to transfer information to a display register from an address in memory to be specified by subsequent key strokes. The above-mentioned calculator instruction key generates a key code identical to a second calculator instruction key which also preconditions the calculator to compute a hyperbolic trigonometric function. The function performed by the calculator is determined by the kind of key depressed following the instruction key, an alpha-numeric key initiating the memory transfer operation or a trigonometric key initiating the computation of a hyperbolic trigonometric function.

2 Claims, 1 Drawing Figure

PATENTED JUL 4 1972 3,675,213
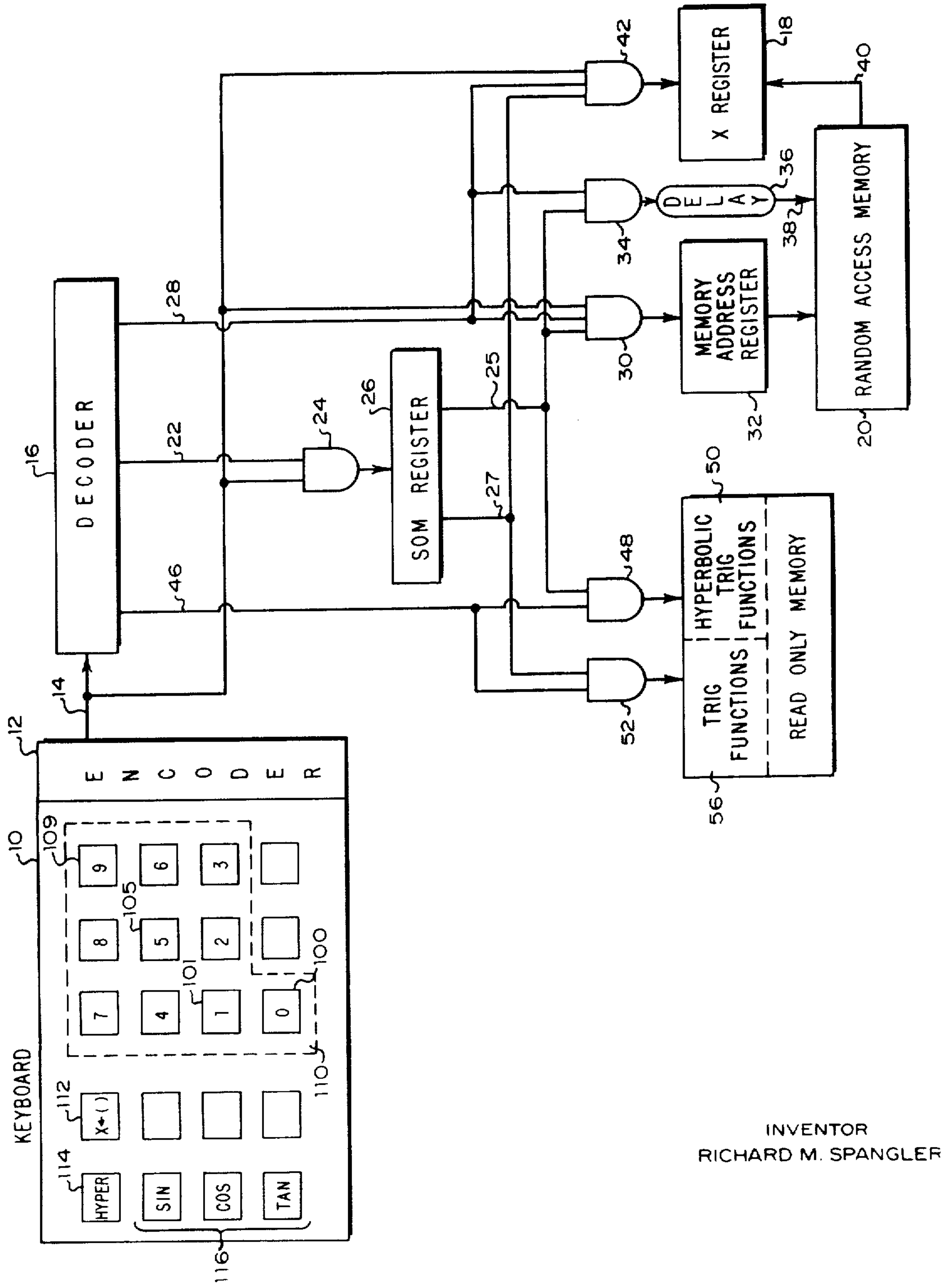
INVENTOR
RICHARD M. SPANGLER

STORED DATA RECALL MEANS FOR AN ELECTRONIC CALCULATOR

BACKGROUND AND SUMMARY OF THE INVENTION

In electronic calculators constructed according to the prior art, retrieval of data from an arbitrary location in memory to the display or working register required a number of steps. Since some programmable calculators have a dozen or more addressable storage registers, fewer steps necessary to move data from memory to a working register mean more program space can be allocated to computation and other operations. An electronic calculator may also have many more functional keys such as multiply, divide, sin, log, etc. than alpha-numeric keys necessitating maximum economical use of internal machine instructions. Unnecessary internal machine instructions increase calculator complexity, which is undesirable.

The present invention discloses the logic circuitry necessary to precondition an electronic calculator to transfer information from an addressable memory location to a working register with a single key stroke. The subsequent key strokes indicate the address in memory of the desired information. The present invention further discloses the logic circuitry necessary to enable the key which initiates the above-mentioned transfer operation to share the same internal machine instruction or key code with another key.

DESCRIPTION OF THE DRAWING

The drawing is a schematic representation of the preferred embodiment of the invention.

DESCRIPTION OF THE PREFERRED EMBODIMENT

The drawing shows a keyboard 10 connected to an encoder 12 which generates a binary code for each key when it is depressed. The encoder may be any of several types, well known in the art, such as a diode matrix (see, e.g., *Digital Computer Principles* by Burroughs Corporation, pp. 323–328 (1962) ) or an OR gate network (see, e.g., *Computer Logic* by Ivan Flores, pp. 193–194 (1960) ). Such an encoder assigns a unique binary code to each key on keyboard 10. For example, five binary digits or bits may comprise a key code, with all numeric keys having codes beginning with 0 and all function keys, with 1. Encoder 12 is connected to a decoder 16 by a line 14 which, though shown as a single line, may actually be a plurality of wires, five wires in the case of a five bit key code. Decoder 16 indicates to other parts of the calculator what kind of a key has been depressed, e.g., number, arithmetic operation, data transfer, etc. The decoder may also be any of several types, well known in the art, such as a diode matrix (see, e.g., *Digital Computer Principles*, supra) or an AND gate network (see, e.g., *Computer Logic*, supra, pp. 194–195). If the five bit key code described above is used, decoder 16 may be provided with two outputs, 28 and 46, connected to the line 14 having the highest order bit. If that bit is a 0, there will be an output on line 28, and if it is a 1, there will be an output on line 46. Other outputs may of course be provided to give output signals in response to the depression of various keys, such as line 22 for key 112.

The working and display register is X register 18. The key which preconditions the calculator to transfer information from addressable locations in a random access memory 20 to the X register 18 is denoted as the "X ← ( )" key or key 112. In this example, key 112 has the same key code as key 114; i.e., the same binary code will appear on line 14 whether key 112 or 114 is depressed. Key 114 is the "HYPER" key, that is, it preconditions the calculator to compute a hyperbolic trigonometric function. The function computed is determined by subsequently depressing one of a plurality of trigonometric function keys 116.

One input of gate 24 is connected to line 14 and since, as previously mentioned, line 14 may include several wires, there will be as many gates 24 as there are wires in line 14. The same holds true for other lines going into and out of decoder 16. If key 112 or 114 is depressed, decoder 16 will put a signal on line 22 connected to a second input of AND gate 24 to cause a signal representative of the key code of keys 112 and 114 to be stored in an intermediate state of machine (SOM) register 26. Register 26 will put a signal on line 25 in response to that stored signal. For the sake of the example, assume that a memory location address may be a single digit 0 through 9 which can be entered by keys 100 through 109, denoted as numeric keys 110. If following the depression of key 112 or 114 one of numeric keys 110 is depressed, decoder 16 will put a signal on line 28 indicating a numeric key has been depressed. AND gate 30, connected to lines 14, 25 and 28, will transfer the numeric key code to memory address register 32. At the same time AND gate 34, connected to lines 25 and 28, will send a signal through delay 36 to transfer input 38 of memory 20. The memory may be any of a number of well known types, such as magnetic core memory (see, e.g., *Computer Logic*, supra, pp. 242–251). Delay 36 delays the transfer signal from gate 34 long enough for the address from gate 30 to be entered into register 32. The transfer signal at input 38 causes the information at the selected address in memory 20 to be transferred to X register 18 over line 40. The logic circuitry necessary for performing memory transfers is well known in the art and will not be described in further detail here (see, e.g., *Computer Logic*, supra, pp. 251–252; *Digital Computer Principles*, supra, pp. 399–410.

Numerical entries from keyboard 10 are also entered into X register 18 since register 18 serves as one of a number of display registers. If SOM register 26 is cleared, there will be a signal on line 27 and none on line 25. If a numeric key 110 is then depressed, the number will be entered into X register 18 and through AND gate 42 which is connected to lines 14, 27 and 28.

If, after key 112 or 114 is depressed, one of keys 116 is depressed, decoder 16 will put a signal on line 46 indicating which trigonometric key was depressed. AND gate 48 connected to line 25 and line 46 will activate a read only memory (ROM) 50 to perform the specified hyperbolic trigonometric function. If SOM register 26 is cleared when one of keys 116 is depressed, AND gate 52, connected to line 27 and line 46, will activate ROM 56 to perform the specified trigonometric function. Programs for computing trigonometric and hyperbolic trigonometric functions in response to the actuation of a key are well known in the art and will not be described in detail here (for example, see U. S. Pat. No. 3,380,031 showing a calculator having trigonometric and hyperbolic trigonometric keys).

I claim

1. An electronic calculator comprising:
   - a keyboard having a plurality of keys, including alpha-numerical, functional and instructional keys, and encoding means for generating a key code signal in response to a key being depressed;
   - a display register;
   - decoder means connected to the encoding means for decoding said key code signal;
   - a random access memory having a plurality of addressable storage locations at which to store segments of information;
   - an intermediate storage register for storing a signal representative of a key code of an instructional key in response to the depression of an instructional key;
   - first logic means for transferring a segment of information at an addressable location in the memory to the display register in response to said signal stored in the intermediate register and one or more alpha-numerical key codes, said alpha-numerical key codes determining said addressable location;
   - second logic means for signalling a first circuit in response to said signal stored in the intermediate register and a functional key code;
   - third logic means for signalling a second circuit in response to a functional key code; and
   - fourth logic means for signalling the display register in response to an alpha-numerical key code.

2. An electronic calculator comprising:

a keyboard having a plurality of keys, including alpha-numerical and instructional keys, and having encoding means for generating a key code signal for each key being depressed;

a random access memory having a plurality of addressable storage locations at which to store information;

a display register;

decoder means connected to the keyboard for decoding said key code signal;

an intermediate storage register;

logic means connected to the decoder means, memory, intermediate register and display register for storing a signal in the intermediate register in response to a predetermined instructional key being depressed to precondition the calculator to transfer to the display register the information stored at one of said addressable locations in the memory, said addressable location being determined by a predetermined number of subsequent alpha-numerical key depressions, the logic means effecting the information transfer after the completion of the predetermined number of subsequent alpha-numerical key depressions.

* * * * *